United States Patent
Jung

[15] 3,674,904
[45] July 4, 1972

[54] FURNACE FOR MAKING FUSED QUARTZ HOLLOW SLUGS

[72] Inventor: Lothar Jung, Millington, N.J.
[73] Assignee: Amersil, Inc., Hillside, N.J.
[22] Filed: May 21, 1971
[21] Appl. No.: 145,611

[52] U.S. Cl..........................................13/20, 13/6, 65/18, 65/347, 65/374
[51] Int. Cl..................F27b 15/00, F27d 3/00, H05b 3/40
[58] Field of Search.....................13/20, 6; 65/18, 347, 374, 65/DIG. 7

[56] References Cited

UNITED STATES PATENTS 3,224,851  12/1965  Hicks, Jr.............................65/DIG. 7
3,213,177  10/1965  Diefendorf............................13/20 X Primary Examiner—Bernard A. Gilheany
Assistant Examiner—R. N. Envall, Jr.
Attorney—Samuel Kahn

[57] ABSTRACT

A furnace for making fused quartz hollow slugs comprising a tubular housing containing an elongated electrical resistor heating means mounted coaxially in the housing with a quartz powder charge chamber intermediate the inner walls of the housing and the heating means, and a contained elastic tubular lining adjacent to and spaced from the inner walls, whereby the lining is hydrostatically motivated to compress a contained quartz powder charge in the charge chamber in the direction of the heating means.

6 Claims, 2 Drawing Figures

INVENTOR
LOTHAR JUNG
BY John G. Kovalick
AGENT

FURNACE FOR MAKING FUSED QUARTZ HOLLOW SLUGS

BACKGROUND OF THE INVENTION

Electrically generated heat has been applied in vacuum furnaces to fuse quartz powder into slugs for subsequent production into tubing. In cases where powder material has been fused into a solid slug, a second high temperature treatment was necessary in order to pierce a hollow slug therefrom, unless a tube drawing tower with a die was used.

Furthermore, in making fused quartz hollow slugs directly during the furnace fusion process of quartz powder, there is the problem of providing a fused quartz hollow slug with a substantially uniform inner fused quartz surface since under certain conditions the quartz powder is not maintained sufficiently compacted at the area of fusion to permit the fusion to satisfactorily conform to the contour of a heating electrode mandrel.

SUMMARY OF THE INVENTION

In accordance with the invention there is provided a furnace for making fused quartz hollow slugs comprising a tubular housing having closure means, such as end caps, clamped or otherwise secured in vacuum-tight relationship on both ends of the housing. Preferably, a coaxial quartz tube, e.g. a tube of clear fused quartz, is mounted in the housing and an elongated resistor heating means is mounted in the quartz tube. A quartz powder charge chamber is provided intermediate the heating means and the housing wall. A contained elastic tubular lining is mounted adjacent to and spaced from the inner wall of the housing. The housing is provided with liquid inlet and outlet means and a vacuum port with the inlet and outlet and vacuum port communicating with the space between the lining and the inner wall of the housing, whereby when vacuum is applied the lining expands radially outward into contact with the housing wall after which the charge chamber is loaded. When the charge chamber is loaded the vacuum is shut off and a liquid, e.g. water, is admitted between lining and wall under suitable hydrostatic pressure which motivates the lining and the powder charge in compression in the direction of the heating means.

DESCRIPTION OF THE PREFERRED EMBODIMENTS

Figure 1:
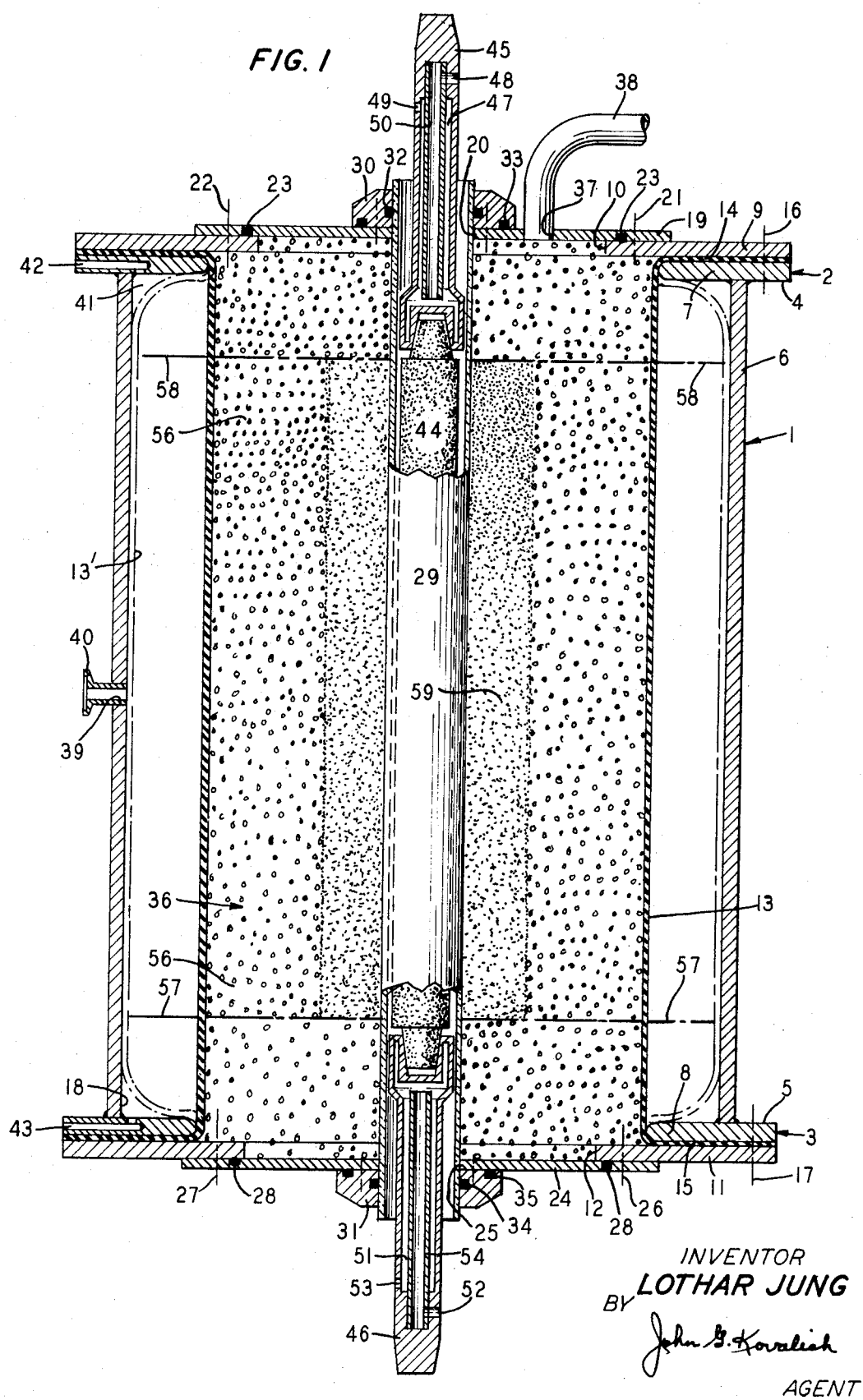
FIG. 1 illustrates a cross-sectional view of the furnace of the invention.

Referring to FIG. 1, the furnace of the invention comprises a tubular housing 1, e.g. a cylindrical tubular housing, having circular first and second flat rings 2 and 3 one each at the opposite open ends thereof. The first and second rings provide circular flanges 4 and 5 extending radially outwardly of the housing wall 6 as well as flanges 7 and 8 extending radially inwardly of the housing wall 6. A third flat ring 9 having a central aperture 10 therethrough is mounted on flat ring 2 across one open end of the housing. A fourth flat ring 11 having a central aperture 12 therethrough is mounted on flat ring 3 across the other open end of the housing. An elastic tubular lining 13 is positioned inside the housing with opposite end portions 14 and 15 passing over the inner edges of inwardly directed flanges 7 and 8 and extending radially outwardly between flat rings 2 and 9 and between flat rings 3 and 11 where they are hermetically secured therebetween by means of a plurality of clamps or bolts (not shown). See, for example, locations 16 and 17 indicating where one of the bolts may be applied to the first and third rings at each end of the housing. Since the lining passes over inwardly directed flanges 7 and 8, it is normally located adjacent to and spaced from the inner surface 18 of housing wall 6.

A closure means 19 in the form of a cap or plate having a central aperture 20 is mounted on outer ring 9, e.g. by means of screws, (not shown) at locations 21 and 22 and with an O-ring 23 therebetween. Another closure means 24 in the form of a cap or plate having a central aperture 25 is mounted on outer ring 11, e.g. by means of screws, (not shown) at locations 26 and 27 and with an O-ring 28 therebetween. A quartz tube 29, e.g. clear fused quartz, is mounted in the housing 1 coaxially thereof and spaced from the lining 13. The tube 29 extends outwardly of both ends of the housing through the apertures 20 and 25 in closure means 19 and 24, respectively. Annular sealing discs 30 and 31 are mounted one each on their respective closure means 19 and 24 around the apertures 20 and 25 and portions of the tube 29 extending outwardly of the apertures. The sealing disc 30 is provided with O-rings 32 and 33 and sealing disc 31 is provided with O-rings 35 and 34 for vacuum-tight relationship between the closure means and the quartz tube 29. As illustrated, the positioning of the tube 29 coaxially and spaced from the lining 13 provides a charge chamber 36 inside the housing 1.

Closure plate 19 is further provided with an aperture 37 through which conduit 38 communicates to the charge chamber 36 for vacuumizing the charge chamber. The wall 6 is provided with an aperture 39 through which vacuum port 40 communicates to the interior space 41 between the inner surface of wall 6 and the elastic lining 13 for vacuumizing the space as hereinafter more particularly described. Flat rings 2 and 3 contain passages 42 and 43 communicating with the said space 41 for filling the space with a hydraulic liquid, e.g. water, as hereinafter more particularly described. Advantageously, the passage 43 is a liquid inlet means and passage 42 is a liquid outlet means. The passages 42 and 43 are operative through a liquid pressure regulating means not shown but generally known.

An elongated electrical resistor means 44, for example, a graphite or carbon rod, is mounted in the quartz tube 29 coaxially thereof as shown and preferably spaced therefrom. Electrodes 45 and 46 are connected to opposite ends of the resistor 44 inside the quartz tube 29. While the closure means 19 and 24 and their associated sealing discs 30 and 31, provided with suitable O-rings of known type, maintain the charge chamber 36 under vacuum when applied through vacuum conduit 38, the tube 29 is open to or exposed to either ambient atmospheric air pressure or otherwise to an atmosphere of controlled pressure and chemical composition suitably applied.

Since the furnace operates at a high temperature sufficient to fuse a bed of quartz particles, the liquid passing through inlet 43 and outlet 42 is a cooling means. Also, since the electrodes operate at high temperature, they are liquid cooled. Electrode 45 is a hollow electrode having an inner cavity 47, an inlet 48 and an outlet 49 and containing a tubular duct 50 communicating with the inlet 48. A liquid coolant enters inlet 48 passes through duct 50 and out of the electrode 45 through outlet 49. The other electrode 46 is a hollow electrode having an inner cavity 51, inlet 52 and an outlet 53 and containing a tubular duct 54 communicating with the inlet 52. A liquid coolant enters inlet 52 passes through duct 54 and out through outlet 53.

Figure 2:
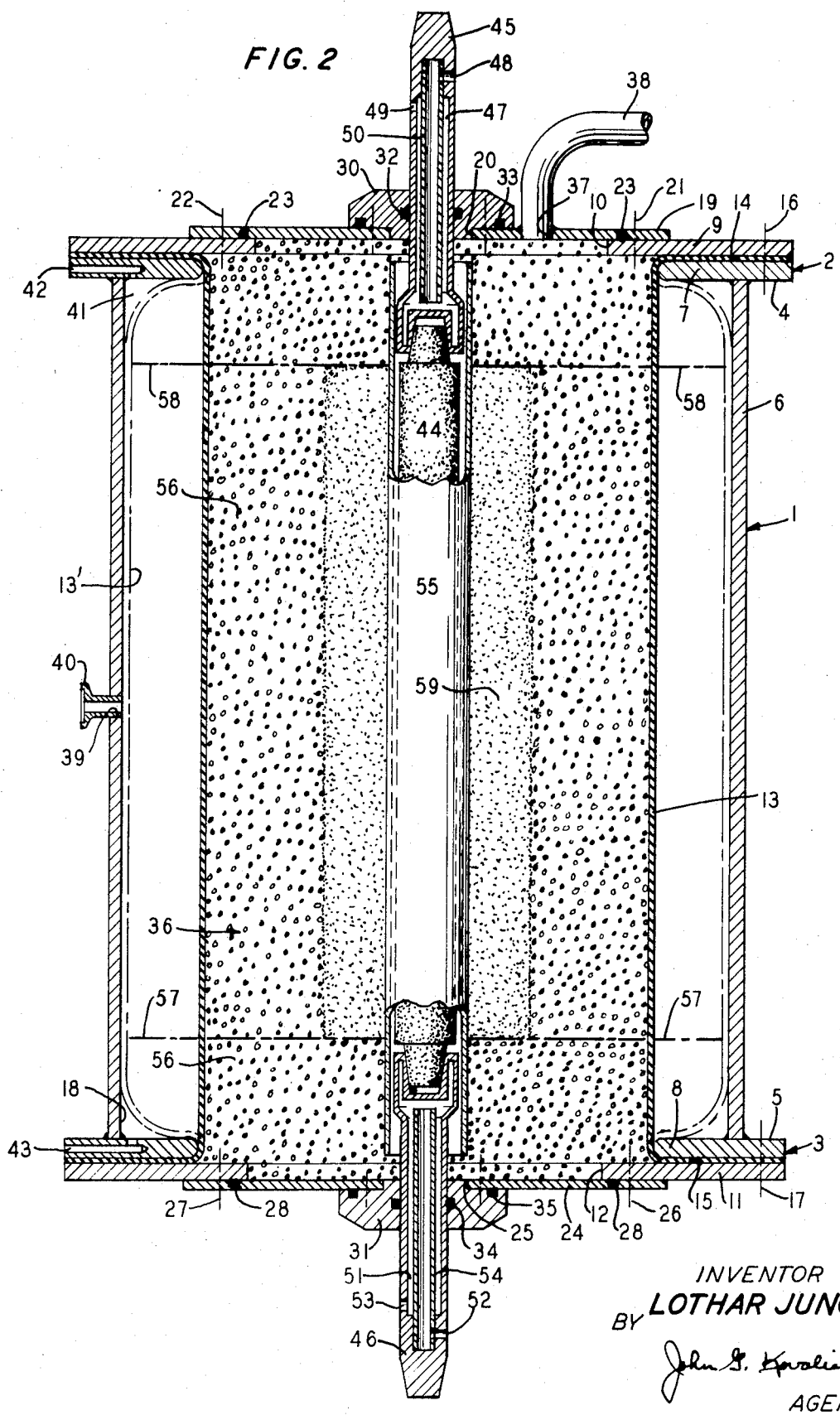
FIG. 2 illustrates a cross-sectional view of a modified form of the invention.

FIG. 2 illustrates a furnace similar to the furnace of FIG. 1 except that it is modified to the extent that the quartz tube 55 which replaces the tube 29 of FIG. 1 is completely hermetically sealed within the housing 1 and is not open to the atmosphere or to a suitable gas. In such case, the sealing discs 30 and 31 are mounted on their closure plates 19 and 24 around the apertures 20 and 25 and in direct contact with the electrodes 45 and 46 with O-rings 32 and 34 providing a hermetic seal in abutment with the electrodes. With this arrangement the inside of quartz tube 55 is subject to the atmosphere prevailing in the charge chamber 36 during fusion of the quartz powder. Depending upon the quality of subsequently made tubing required for certain applications, the quartz protection tube 55 may be eliminated.

While the furnace is in an upright position as illustrated by FIG. 1, and before the top closure plate 19 and sealing 30 are mounted, vacuum is applied to the space 41 by means of vacuum port 40 which expands the elastic lining 13 from its natural spaced position relative to wall 6 toward the inner surface of wall 6 as indicated at 13'. With the lining in its expanded position, the bottom portion of the charge chamber 36 is provided with a bottom layer of an insulation material in powder or granule form, e.g. crushed graphite 56 such as to a height 57. A filling tube composed of suitable material (not shown) of a diameter greater than quartz tube 29 is positioned coaxially over the quartz tube and rested on the top of the bottom layer of insulation material 56. Additional insulation material is supplied to the charge chamber encompassing the filling tube to the top thereof as at location 58. Quartz powder 59 is applied to fill the filling tube around quartz tube 29. The filling tube is then removed and the charge chamber is further filled with insulation material 56 providing a top cover layer. The closure plate 19 and sealing disc 30 are then mounted and secured to the housing hermetically sealing the charge chamber. Vacuum port 40 is then suitably closed and a liquid, e.g. water, is applied to liquid inlet 43 under suitable hydrostatic pressure while the exit thereof through outlet 42 is suitably controlled by a valve means (not shown). As the hydrostatic pressure is selectively applied in space 41, the insulation material 56 and quartz powder 59 are thereby compressed and compacted by the hydrostatically activated lining toward the quartz tube 29 of FIG. 1 or quartz tube 55 of FIG. 2 and the contained heating means 44, as illustrated by FIGS. 1 and 2. Either during the compaction of the insulation material and quartz powder or afterwards, the charge chamber is under vacuum applied through the vacuum conduit 38. Thereafter, the electrodes are connected to a source of electrical energy and the resistor 44 is heated whereby the quartz tubes 29 and 55 become plastic and conform to the contour of the heating means 44 while the quartz powder becomes progressively fused to the quartz of the quartz tube into the form of a quartz slug. Having provided a quartz slug of pre-established thickness, the electric energy to the electrodes is discontinued and the mass in the charge chamber is permitted to cool. Upon cooling, since the material of the heating means contracts more than that of quartz, the fused quartz of the quartz tube separates from the heating means, whereby the contents of the charge chamber are easily removed leaving the inner surface of the thereby formed hollow quartz slug in a substantially uniform condition.

Various modifications of the invention are contemplated within the scope of the appended claims.

I claim:

1. A furnace for making fused quartz hollow slugs comprising a tubular housing having vacuum-tight closure means at both ends, an elongated electrical resistor heating means mounted coaxially in the housing, a charge chamber in the housing intermediate the tubular wall of the housing and the resistor heating means, an elastic tubular lining mounted in the housing adjacent to and spaced from the tubular wall of the housing, means for vacuumizing the space between the lining and the tubular wall, and means for hydrostatically motivating the lining in the direction of the electrical resistor heating means.

2. A furnace for making fused quartz hollow slugs according to claim 1, comprising electrode means mounted at both ends of elongated electrical resistor heating means.

3. A furnace for making fused quartz hollow slugs according to claim 1, comprising an elongated quartz tube mounted in the housing with the resistor heating means being contained by the quartz tube coaxially thereof, opposite end portions of the quartz tube passing through the closure means in vacuum-tight relationship therewith, the inner space of the quartz tube being open to an atmosphere under suitable pressure.

4. A furnace for making fused quartz hollow slugs according to claim 1, comprising vacuum means communicating with the charge chamber for vacuumizing the charge chamber.

5. A furnace for making fused quartz hollow slugs according to claim 1, comprising an elongated quartz tube mounted in the housing with the resistor means being contained by the quartz tube, the quartz tube being completely contained within the housing.

6. A furnace for making fused quartz hollow slugs according to claim 2, wherein the electrodes are hollow electrodes having inner cavities, and means for admitting a coolant liquid into the inner cavities.

* * * * *